United States Patent
Morden et al.

(10) Patent No.: US 11,001,393 B2
(45) Date of Patent: May 11, 2021

(54) WASHER ASSEMBLY WITH SEAL FOR LIGHTNING-PROTECTION FASTENERS AND METHOD OF USE

(71) Applicant: The Boeing Company, Chicago, IL (US)

(72) Inventors: Sean Dennis Morden, Federal Way, WA (US); Peter Apolonio Coronado, Lynnwood, WA (US); Haftom Y. Dessalegn, Mountlake Terrace, WA (US)

(73) Assignee: THE BOEING COMPANY, Chicago, IL (US)

( * ) Notice: Subject to any disclaimer, the term of this patent is extended or adjusted under 35 U.S.C. 154(b) by 312 days.

(21) Appl. No.: 16/144,463

(22) Filed: Sep. 27, 2018

(65) Prior Publication Data

US 2020/0102091 A1 Apr. 2, 2020

(51) Int. Cl.
*B64D 45/02* (2006.01)
*F16B 43/02* (2006.01)
*F16B 37/14* (2006.01)
*F16B 33/00* (2006.01)

(52) U.S. Cl.
CPC ............ *B64D 45/02* (2013.01); *F16B 33/004* (2013.01); *F16B 37/145* (2013.01); *F16B 43/02* (2013.01); *B32B 2605/18* (2013.01)

(58) Field of Classification Search
CPC ........ F16B 5/02; F16B 5/0283; F16B 33/004; F16B 37/14; F16B 37/145; F16B 43/001; F16B 43/02; B64D 45/02; B32B 2605/18
See application file for complete search history.

(56) References Cited

U.S. PATENT DOCUMENTS

| | | | |
|---|---|---|---|
| 2,795,444 A | 6/1957 | Nenzell | |
| 3,170,701 A | 2/1965 | Hoover | |
| 3,588,133 A | 6/1971 | Caserta | |
| 4,630,168 A | 12/1986 | Hunt | |
| 7,050,286 B2 * | 5/2006 | Pridham | ................ B64D 45/02 244/1 A |
| 7,599,164 B2 | 10/2009 | Heeter et al. | |
| 7,755,876 B2 | 7/2010 | Morrill et al. | |
| 9,291,187 B2 | 3/2016 | Whitlock et al. | |

(Continued)

FOREIGN PATENT DOCUMENTS

CA 2785045 A1 * 10/2009 ....... B29C 66/72321

*Primary Examiner* — Matthew V Nguyen
(74) *Attorney, Agent, or Firm* — Armstrong Teasdale LLP (57) ABSTRACT

A method of protecting an air vehicle against lightning strikes includes inserting a fastener through a hole in conjoined structures, the fastener defining an axis along its length and having a threaded end and a sleeve, and installing a washer assembly over the threaded end and the sleeve, the washer assembly having a metallic washer and a polymer seal radially inward of the metallic washer. The seal includes a lower seal portion defining a counter-bore, and an upper seal portion extending axially from the lower seal portion. The method includes installing a counter-bored nut on the threaded end, and applying torque to the nut to compress the lower seal portion against a surface of the conjoined structures and around the sleeve at the counter-bore of the seal, and to compress the upper seal portion of the seal into a counter-bore of the nut and around the threaded end.

20 Claims, 9 Drawing Sheets

(56) References Cited

U.S. PATENT DOCUMENTS

| | | |
|---|---|---|
| 9,611,052 B2 | 4/2017 | Whitlock et al. |
| 2007/0258182 A1 | 11/2007 | Morrill et al. |
| 2011/0014010 A1 | 1/2011 | DeGraan |
| 2014/0055906 A1* | 2/2014 | Whitlock ............... B64D 45/02 361/218 |
| 2014/0230228 A1 | 8/2014 | Whitlock et al. |
| 2017/0098930 A1 | 4/2017 | Le et al. |

* cited by examiner

WASHER ASSEMBLY WITH SEAL FOR LIGHTNING-PROTECTION FASTENERS AND METHOD OF USE

CROSS-REFERENCE TO RELATED APPLICATIONS

This application is related to U.S. patent application Ser. No. 16/144,403 titled "Washer Assembly with Seal for Lightning-protection Fasteners and Method of Manufacture," filed on Sep. 27, 2018 by Sean Dennis Morden, et al., and commonly assigned to The Boeing Company of Chicago, Ill., the entire contents of which are hereby incorporated herein by reference.

FIELD

The field of the disclosure relates generally to lightning-protection fasteners and, more specifically, to a washer assembly having a polymer seal to reduce sparking and arcing that may occur around the fastener due to lightning strikes.

BACKGROUND

Structural fabrication generally utilizes metallic fasteners to join one structure to another. Such metallic fasteners, particularly in composite structures found, for example, in aircraft, can create sparking and arcing during a lightning strike, sometimes referred to as electromagnetic effects (EME) or hot particle ejection (HPE). During such events, current generated by the lightning strike is conducted through the metallic fasteners into the conjoined structures and, notably, between the conjoined structures. The current flows result in contact resistance heating that can break down the materials of the conjoined structures and the metallic fastener to generate hot gases, or plasma, in the fastener hole, i.e., in the void between the fastener and the walls of the conjoined structures, and in the void between the fastener and the nut. Left un-mitigated, when pressures are great enough, the hot gas may escape these voids through "a path of least resistance," sometimes found between the fastener head and the conjoined structures or around the washer and nut installed on the opposite end of the fastener. Escaping gas may further erode the conjoined structures or elements of the fasteners themselves, creating heated, or "energized," particles or droplets referred to as HPE.

The current flows resulting from a lightning strike, left un-mitigated, may also cause arcing between edges of elements of the metallic fasteners and the conjoined structures. For example, arcing may occur between a bolt and the conjoined structures, between a nut and washer, between either of the nut and washer and the bolt, or between either of the nut and washer and the conjoined structures.

Heated gas, plasma, or heated particles, or "droplets," may, under certain circumstances, be ejected into spaces containing oxygen and fuel vapor, or other flammable gas or vapor, that could ignite. To mitigate these effects, at least some known lightning-protection fasteners utilize pre-molded caps that guard fastener heads, nuts, and washers. Such pre-molded caps are generally costly and require substantial labor and time to install. Other known lightning-protection fasteners utilize conductive coatings and interference fits to reduce contact resistances among elements of the metallic fasteners and between the metallic fastener and the conjoined structures themselves. It is desirable to have more effective and efficient means of mitigating sparking, arcing, and other potential EME resulting from lightning strikes due to metallic fasteners.

This Background section is intended to introduce the reader to various aspects of art that may be related to the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

One aspect is directed to a washer assembly including a metallic washer and a polymer seal. The metallic washer defines a cylindrical void and an axis therethrough. The polymer seal is attached to the metallic washer and is positioned radially inward thereof. The polymer seal includes a lower seal portion positioned at least partially within the cylindrical void and defining a counter-bore, and an upper seal portion extending axially from the lower seal portion. The lower seal portion is configured to engage, at the counter-bore, a fastener to form a seal to reduce escape of energized particles. The upper seal portion is configured to engage a counter-bore of a counter-bored nut to form a seal inside the counter-bored nut to reduce escape of energized particles.

Another aspect is directed to a method of manufacturing a washer assembly for a lightning-protection fastener. The method includes forming a washer from a metal material, the washer defining a cylindrical void and an axis therethrough. The method includes forming a seal from a high-strength polymer material. Forming the seal includes forming a lower seal portion defining a counter-bore. The lower seal portion is configured to engage, at the counter-bore, the lightning-protection fastener to form a seal to reduce escape of energized particles. Forming the seal includes forming an upper seal portion extending axially from the lower seal portion. The upper seal portion is configured to engage a counter-bore of a counter-bored nut to form a seal inside the counter-bored nut to reduce escape of energized particles. The method includes attaching the seal to the washer in the cylindrical void.

Another aspect is directed to another method of manufacturing a washer assembly for a lightning-protection fastener. The method includes forming a washer from a metal material, the washer defining a cylindrical void and an axis therethrough. The method includes inserting the washer into tooling for molding a polymer seal in the cylindrical void. The tooling includes a lower seal mold configured to form a lower seal portion, the lower seal mold defining a counter-bore. The lower seal portion is configured to engage, at the counter-bore, the lightning protection fastener to form a seal to reduce escape of energized particles. The tooling includes an upper seal mold configured to form an upper seal portion. The upper seal mold extends axially from the lower seal mold. The upper seal portion is configured to engage a counter-bore of a counter-bored nut for the lightning-protection fastener to reduce escape of energized particles. The method includes injecting a high-strength polymer into the tooling, to form the polymer seal integrally with the washer.

Another aspect is a method of protecting an air vehicle against lightning strikes. The method includes inserting a sleeved fastener through a hole in conjoined structures, the sleeved fastener defining an axis along its length and having a threaded end and a sleeve. The method includes installing a washer assembly over the threaded end and the sleeve, the washer assembly having a metallic washer and a polymer seal radially inward of the metallic washer. The polymer seal includes a lower seal portion defining a counter-bore, and an upper seal portion extending axially from the lower seal portion. The method includes installing a counter-bored nut on the threaded end of the sleeved fastener. The method includes applying torque to the counter-bored nut to compress the lower seal portion against a surface of the conjoined structures and around the sleeve at the counter-bore of the polymer seal, and to compress the upper seal portion of the polymer seal into a counter-bore of the counter-bored nut and around the threaded end of the sleeved fastener.

Yet another aspect includes a fastener assembly, including a sleeved fastener, a washer assembly, and a counter-bored nut. The sleeved fastener includes a sleeve and a shank extending therethrough. The shank defines an axis along its length and has a threaded end. The sleeved fastener is configured to be inserted through a hole in conjoined structures. The washer assembly includes a metallic washer and a polymer seal radially inward of the metallic washer. The polymer seal includes a lower seal portion defining a counter-bore, and an upper seal portion extending axially from the lower seal portion. The washer assembly is configured to be installed over the threaded end and the sleeve of the sleeved fastener. The counter-bored nut includes a counter-bore and threads defined therein. The counter-bored nut is configured to be installed on the threaded end of the sleeved fastener and turned to compress the lower seal portion against a surface of the conjoined structures and around the sleeve at the counter-bore of the polymer seal, and to compress the upper seal portion of the polymer seal into a counter-bore of the counter-bored nut and around the threaded end of the sleeved fastener.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

Embodiments of the systems described include a washer assembly having a metallic washer and a polymer seal that engages both a counter-bored nut and a shank or sleeve of a metallic fastener to reduce potential sparking, arcing, or other EME due to lightning strikes. The washer assembly described herein may be used with any suitable metallic fasteners for joining two or more structures. The metallic fastener may include, for example, a cylindrical shank bolt, a tapered shank sleeve bolt, or a cylindrical shank sleeve bolt. The polymer seal includes a lower seal portion and an upper seal portion. The lower seal portion defines a counter-bore and is configured to engage, at the counter-bore, a shank or sleeve of the fastener to form a seal between the fastener and the conjoined structures. The upper seal portion extends axially from the lower seal portion and is configured to engage a counter-bore of a counter-bored nut to form a seal between the counter-bored nut and the shank of the fastener. The polymer seal is fabricated by, for example, injection molding or insertion molding, from a high-strength polymer material, sometimes referred to as "engineering thermoplastic" or simply "engineering plastic." The polymer seal is attached to the metallic washer and position radially inward of the metallic washer. The polymer seal, when compressed among the counter-bored nut, the metallic washer, the shank or sleeve of the metallic fastener, and the conjoined structure, forms a lower seal that seals a first void defined between the fastener and the walls of the conjoined structure to reduce escape of energized particles, such as hot gas or heated material from the conjoined structures or elements of the metallic fastener itself, from the first void; and an upper seal that seals a second void defined between the threaded end of the fastener and the wall of the counter-bored nut to reduce escape of energized particles from the second void.

Figure 1:
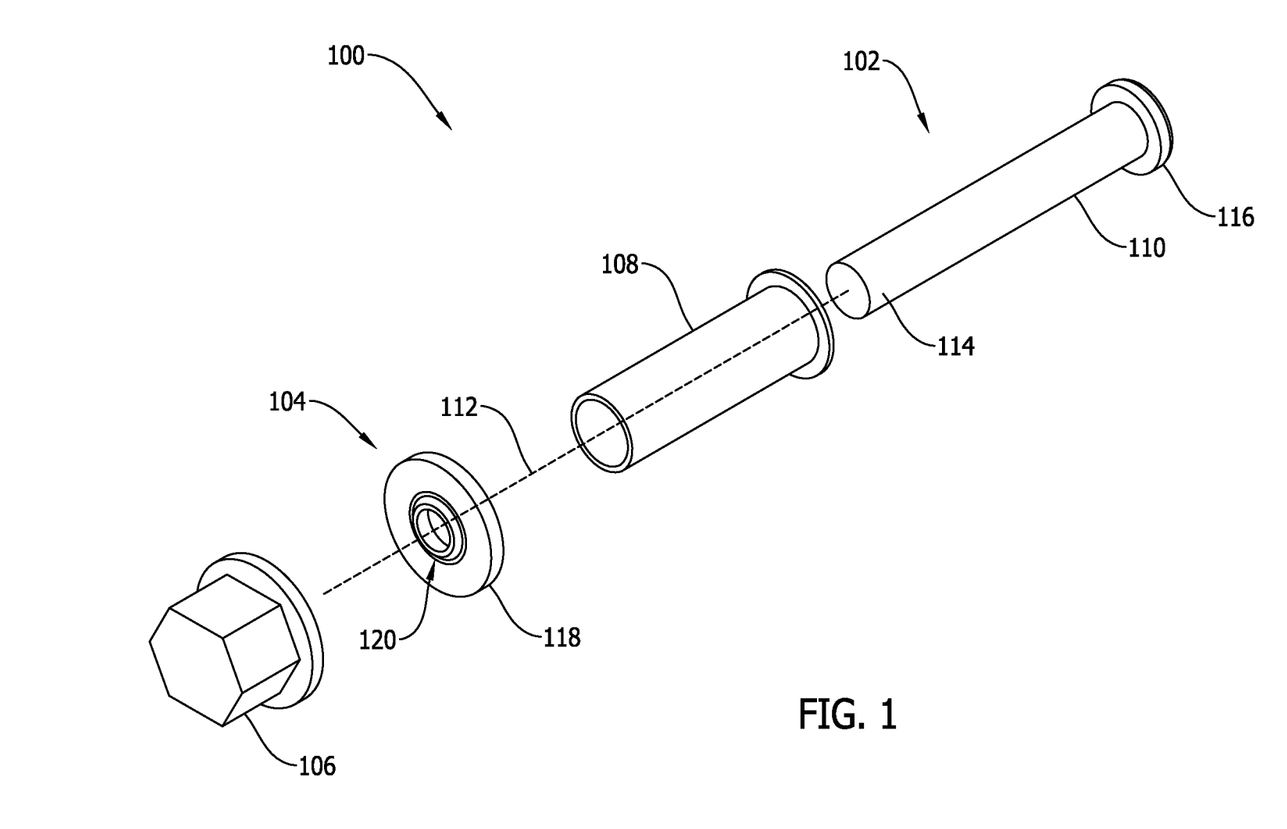
FIG. 1 is a perspective diagram of an example of a metallic fastener assembly for joining two or more structures.

FIG. 1 is a perspective diagram of an example of a metallic fastener assembly 100 for joining two or more structures (not shown). Fastener assembly 100 includes a sleeved fastener 102, a washer assembly 104, and a counter-bored nut 106. The sleeved fastener includes a sleeve 108 and a shank 110 extending through sleeve 108. Shank 110 defines an axis 112 along its length. Shank 110 includes a threaded end 114 and a head 116. Sleeved fastener 102 is configured to be inserted through a hole in conjoined structures (not shown). The conjoined structures may include, for example, two or more structures fabricated from composite materials, i.e., composite structures.

Sleeved fastener 102 may be fabricated, for example, from stainless steel, nickel, titanium, or other suitable material for joining composite structures. In one embodiment, sleeve 108 may be fabricated from stainless steel and shank 110 may be fabricated from nickel. Sleeve 108, in certain embodiments, is a thin sleeve having a thickness of about 10 thousandths of an inch (mills). In alternative embodiments, sleeve 108 is a thick sleeve having a thickness of about 100 mills or more. Sleeved fastener 102, sometimes referred to as a "sleeve bolt," includes, in certain embodiments, a tapered shank, i.e., shank 110. In such embodiments, sleeve 108 is likewise tapered, or may be inversely tapered such that, when shank 110 is inserted through sleeve 108, the opposite tapers engage each other and sleeved fastener 102, as a whole, has a cylindrical profile. In embodiments where sleeve 108 has a like-taper to shank 110, the hole in the conjoined structures is generally also tapered to provide a "friction fit" with fastener assembly 100. In embodiments where sleeve 108 has an inverse taper, the hole in the conjoined structures may be formed cylindrically to provide the friction fit with fastener assembly 100. In alternative embodiments, a cylindrical-shank fastener, or "US bolt," may be substituted for sleeved fastener 102. Cylindrical-shank fasteners generally have a "clearance fit" with the conjoined structures. Clearance fit fasteners may, under certain circumstances, produce additional arcing and, therefore, additional heated gasses and gas pressure in the voids defined between the conjoined structures and fastener assembly 100.

Figure 2A:
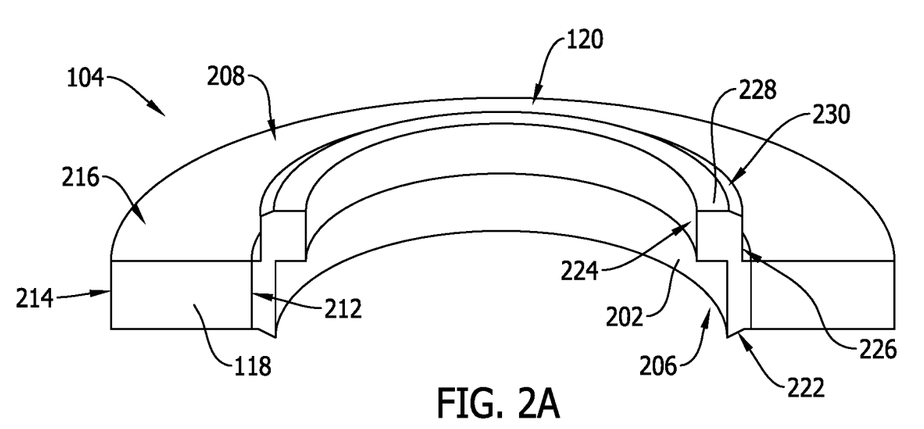
FIGS. 2A and 2B are perspective diagrams of a cross section of an example of a washer assembly for use in the metallic fastener assembly shown in FIG. 1.
Figure 2B:
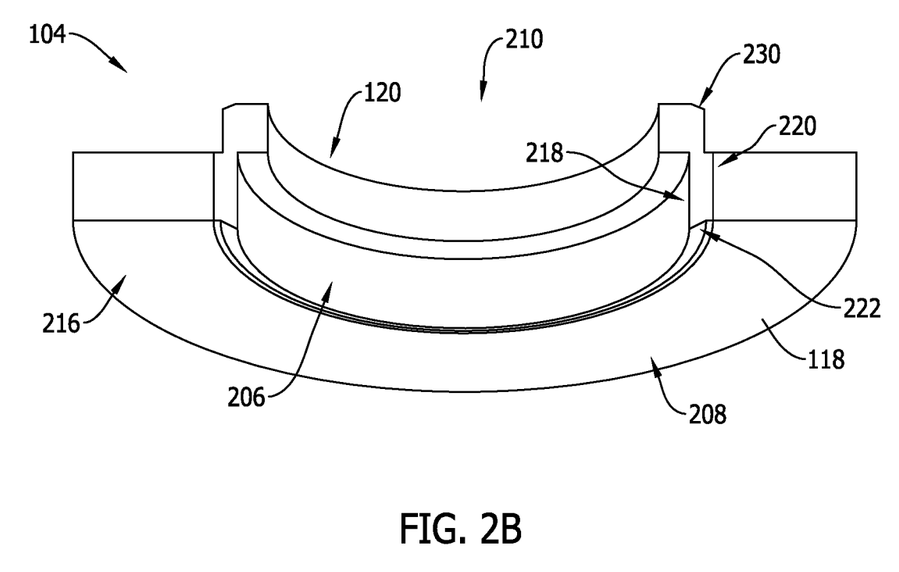
Figure 3A:
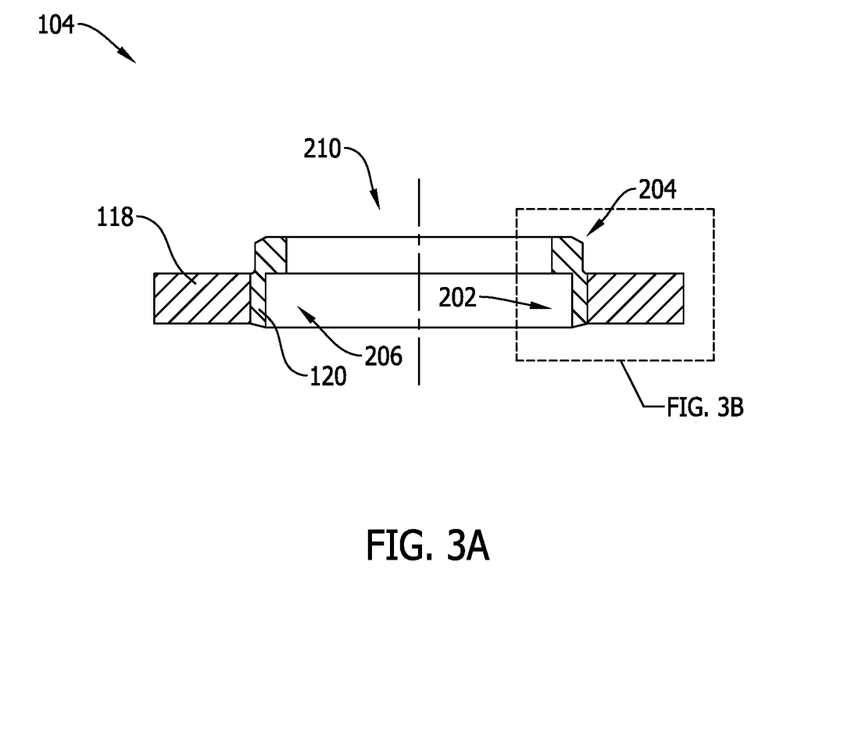
FIGS. 3A and 3B are cross-sectional schematics of the washer assembly shown in FIGS. 2A and 2B.
Figure 3B:
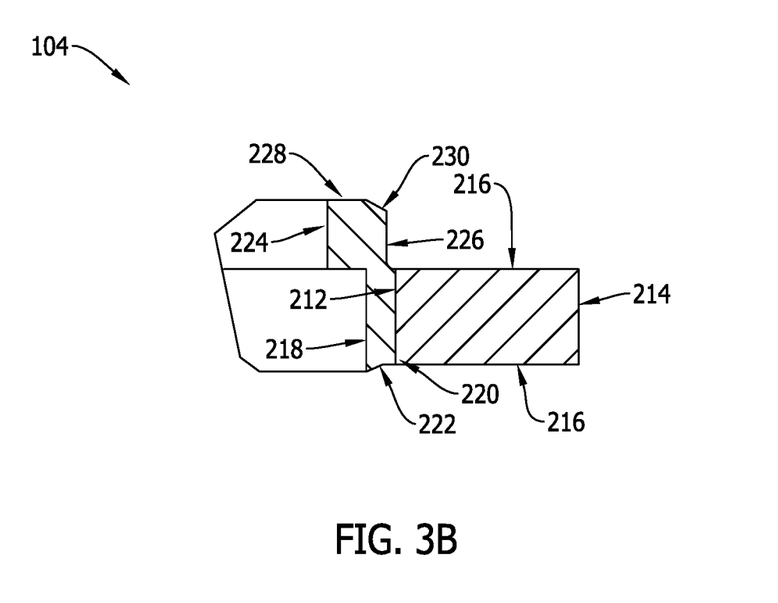
Figure 3C:
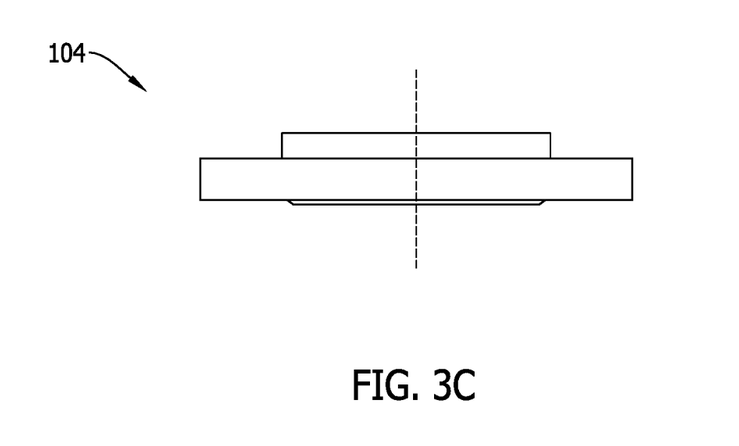
FIG. 3C is a side-view schematic of the washer assembly shown in FIGS. 2A and 2B.
Figure 3D:
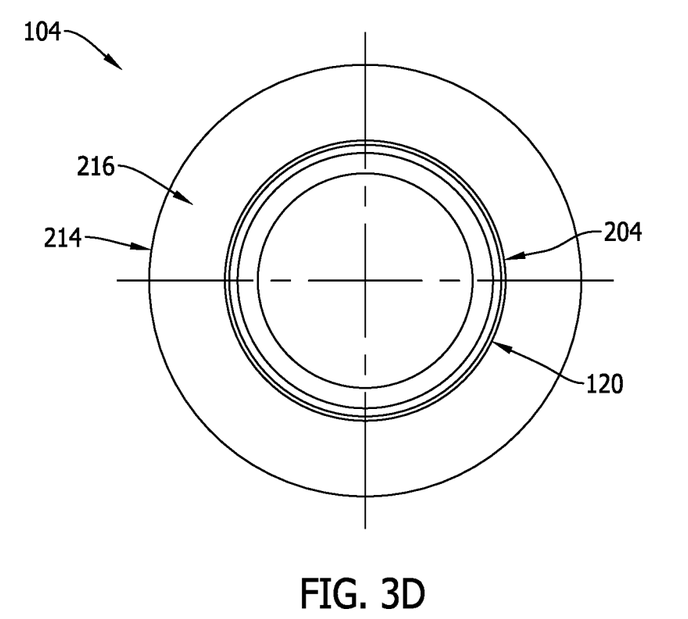
FIGS. 3D and 3E are top- and bottom-view schematics of the washer assembly shown in FIGS. 2A and 2B.
Figure 3E:
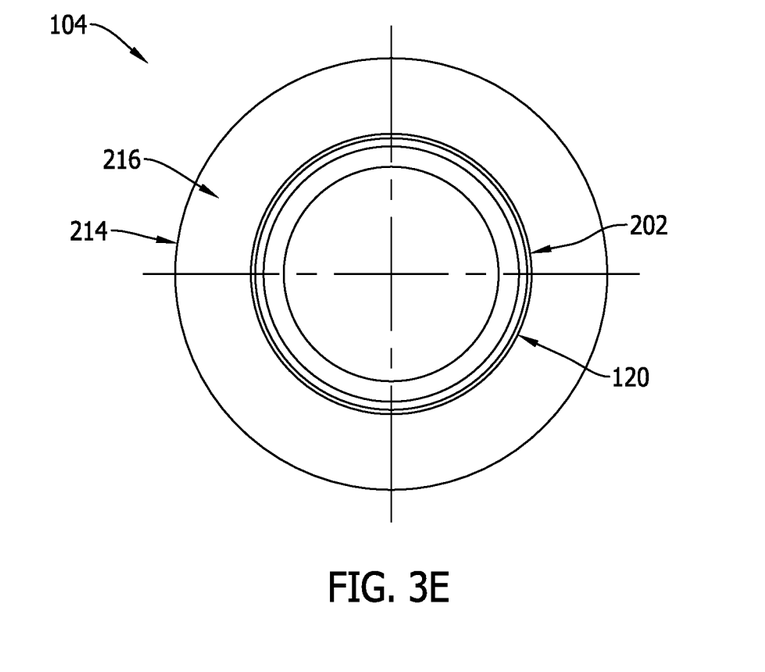

Washer assembly 104 is configured to be installed over threaded end 114 and sleeve 108. FIGS. 2A and 2B are perspective diagrams of a cross section of washer assembly 104 for use in fastener assembly 100 shown in FIG. 1. FIGS. 3A and 3B are cross-sectional schematics of washer assembly 104 shown in FIGS. 2A and 2B. FIG. 3C is a side-view schematic of washer assembly 104 shown in FIGS. 2A and 2B. FIGS. 3D and 3E are top- and bottom-view schematics, respectively, of washer assembly 104 shown in FIGS. 2A and 2B.

Washer assembly 104 includes a metallic washer 118 and a polymer seal 120. In certain embodiments, washer assembly 104 includes a dielectric material 208 coating metallic washer 118. Dielectric material 208 may include, for example, a heat-cured plastic paint, a dielectric primer, a catalyzing paint, or other suitable material applied to a suitable thickness and having sufficient dielectric properties to provide sufficient standoff voltage (e.g., 250 Volt) to withstand the voltages that may be generated in a composite structure in the event of a lightning strike on the composite structures through which fastener assembly 100 is inserted.

Polymer seal 120 includes a lower seal portion 202 and an upper seal portion 204. Lower seal portion 202 defines a counter-bore 206. Upper seal portion 204 extends axially, i.e., extends in the dimension of axis 112, from lower seal portion 202. Counter-bored nut 106 includes a counter-bore and threads defined therein (not shown), and is configured to be installed on threaded end 114 of sleeved fastener 102. Counter-bored nut 106 is further configured to be turned to compress lower seal portion 202 against a surface of the conjoined structures and around sleeve 108 at counter-bore 206 of polymer seal 120, and to compress upper seal portion 204 of polymer seal 120 into the counter-bore of counter-bored nut 106 and around threaded end 114 of sleeved fastener 102.

Metallic washer 118 defines a cylindrical void 210 and further defines axis 112 that passes through metallic washer 118. Metallic washer 118 includes a metallic annulus, or ring, composed of, or fabricated from, a metal such as, for example, steel, stainless steel, nickel, titanium, or any other suitable metal or metal alloy. The metallic annulus includes a radially inner surface 212 that bounds cylindrical void 210, a radially outer surface 214, and opposing axial end surfaces 216. Dielectric material 208, in certain embodiments, coats at least radially outer surface 214 and opposing axial end surfaces 216. In certain embodiments, dielectric material 208 also coats radially inner surface 212. Dielectric material 208, in certain embodiments, is applied prior to setting polymer seal 120 into cylindrical void 210 of metallic washer 118.

Polymer seal 120 is attached to metallic washer 118 and is positioned radially inward of metallic washer 118. Lower seal portion 202 is positioned at least partially within cylindrical void 210. Upper seal portion 204 extends axially from lower seal portion 202. Upper seal portion 204 is configured to engage a counter-bore of counter-bored nut 106 to form a seal inside counter-bored nut 106. Polymer seal 120 is composed of, or fabricated from, a high-strength polymer, or "engineering thermoplastic." Suitable high-strength polymers include, for example, semi-crystalline and amorphous polymers having compressive strength of at least 10,000 pounds per square inch (PSI). Such high-strength polymers include, for example, polyaryletherketones (PAEK), polyamide-imides (PAI), polyimide (PI), polyphenylene sulfides (PPS), polyphenyl sulfones (PPSU), and polyaryl ether sulfones (PAES). PAEK is a family of certain high-strength polymers including, for example, polyether ether ketone (PEEK) and polyether ketone (PEK). In certain embodiments, polymer seal 120 includes filler distributed throughout the polymer to strengthen the material, improve its performance under compression and tension, and improve its resistance to deformation when exposed to pressure, heat, or both. In such embodiments, the filler may include glass filament, glass bead, fiber glass filament, boron nitride, or other suitable filler material that enables polymer seal 120 to function as described herein. Notably, at least some polymers include a filler material having electrically-conductive properties, such as, for example carbon, that render such a polymer less suitable to function as polymer seal 120.

Lower seal portion 202 is configured to engage, at counter-bore 206, sleeve 108 of sleeved fastener 102 to form a seal over sleeved fastener 102. In certain embodiments, where a cylindrical-shank fastener is substituted for sleeved fastener 102, lower seal portion 202 is configured to engage, at counter-bore 206, the cylindrical-shank fastener to form a seal over the cylindrical-shank fastener. Lower seal portion 202 of polymer seal 120 includes a polymeric annulus, or ring, having a radially inner surface 218 that bounds counter-bore 206 and extends axially beyond metallic washer 118 in a direction, along axis 112, opposite upper seal portion 204. The polymeric annulus also includes a radially outer surface 220 that is coextensive with metallic washer 118, and a fillet 222 extending between radially inner surface 218 and radially outer surface 220.

Upper seal portion 204 is configured to engage a counter-bore of counter-bored nut 106 to form a seal inside counter-bored nut 106. Upper seal portion 204 includes a polymeric annulus, or ring, having a radially inner surface 224 that bounds cylindrical void 210, a radially outer surface 226, and an axial end surface 228 positioned distal of counter-bore 206 defined by polymer seal 120. The polymeric annulus also includes a fillet 230 that extends from radially outer surface 226 to axial end surface 228.

Figure 4A:
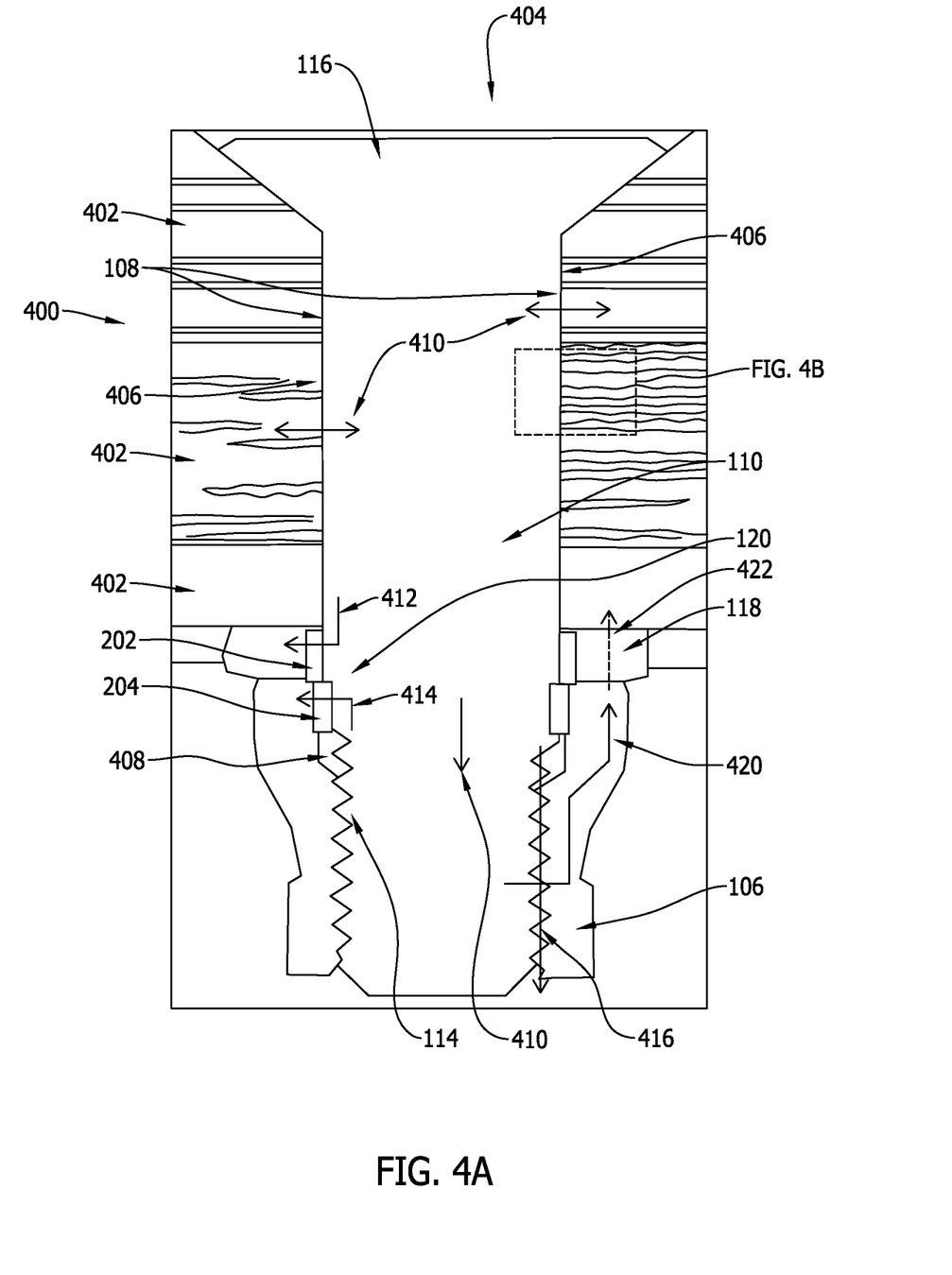
FIG. 4A is a cross-sectional illustration of the metallic fastener assembly shown in FIG. 1 during a lightning strike.

FIG. 4A is a cross-sectional illustration of fastener assembly 100 shown in FIG. 1 during a lightning strike. Fastener assembly 100 includes sleeved fastener 102 inserted through a hole in a conjoined structures 400. Conjoined structures 400 includes first and second composite structures 402, washer assembly 104, and counter-bored nut 106. Sleeved fastener 102 includes sleeve 108 and shank 110 extending through sleeve 108. Shank 110 includes threaded end 114 and head 116. Sleeved fastener 102 is configured to be inserted through a hole 404 in conjoined structures 400.

Figure 4B:
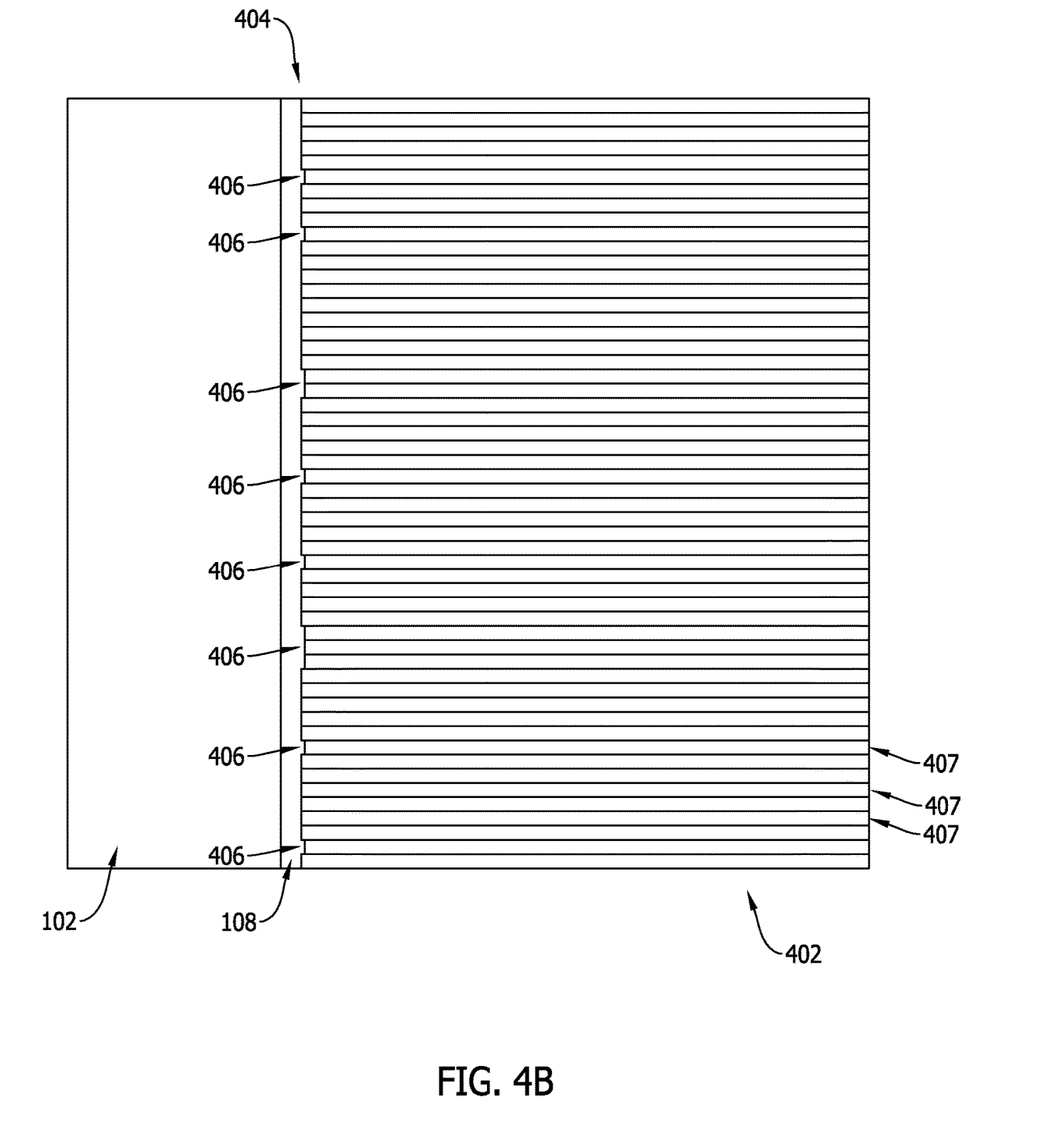
FIG. 4B is a detailed view of a portion of the cross-sectional illustration shown in FIG. 4A.

FIG. 4B is a detailed view of a portion of the cross-sectional illustration of fastener assembly 100 shown in FIG. 4A. FIG. 4B illustrates voids 406 defined between sleeve 108 of sleeved fastener 102 and hole 404 in conjoined structures 400. More specifically, voids 406 may be defined between the walls of individual layers, or "plys" 407, of composite structures 402 and sleeve 108 of sleeved fastener 102. Voids 406 may result from imprecision, or "roughness," of the drilling process by which hole 404 is bored through plys 407. Referring again to FIG. 4A, additional voids 408 may be defined between threaded end 114 of sleeved fastener 102 and the wall of counter-bored nut 106. During a lightning strike, for example, current 410 is conducted between conjoined structures 400 and sleeved fastener 102. Such a transfer of energy may result in resistive heating and generation of hot gasses, plasma, or other energized particles that gather and create pressure in voids 406 and 408. Such energized particles (e.g., gasses) may emerge, or escape, from voids 406 and 408 through paths between conjoined structures 400 and metallic washer 118 (illustrated by path 412), between metallic washer 118 and counter-bored nut 106 (illustrated by path 414), or between sleeved fastener 102 and counter-bored nut 106 (illustrated by path 416). Additionally, current 410 conducts toward threaded end 114 of shank 110 and potentially into counter-bored nut 106. Current 410 may further be conducted from counter-bored nut 106 to metallic washer 118 and back into conjoined structures 400, as illustrated by current paths 420 and 422. Current 410 and current paths 420 and 422 may result in arcing among sleeved fastener 102, washer assembly 104, and counter-bored nut 106, or from edges of fastener assembly 100.

When, for example, conjoined structures 400 forms a portion of fuel tank or other sensitive space, it is desirable to avoid escape of energized particles or arcing into the fuel tank. Accordingly, energized particles such as molten metal (i.e., "sparks"), hot gasses, or plasmas are directed, for example, into plys 407 of composite structures 402 or toward head 116. Polymer seal 120 is positioned to seal against the escape of energized particles For example, lower seal portion 202 prevents escape of energized particles from voids 406 through path 412. Upper seal portion 204 prevents escape of energized particles from voids 408 through path 414. Further, dielectric material 208 coating metallic washer 118, for example, prevents current 410 from conducting through metallic washer 118 from counter-bored nut 106 to conjoined structures 400. More specifically, dielectric material 208 applied to metallic washer 118 breaks, or disrupts, current path 422 to reduce arcing among sleeved fastener 102, washer assembly 104, and counter-bored nut 106, and from edges of fastener assembly 100.

Figure 5:
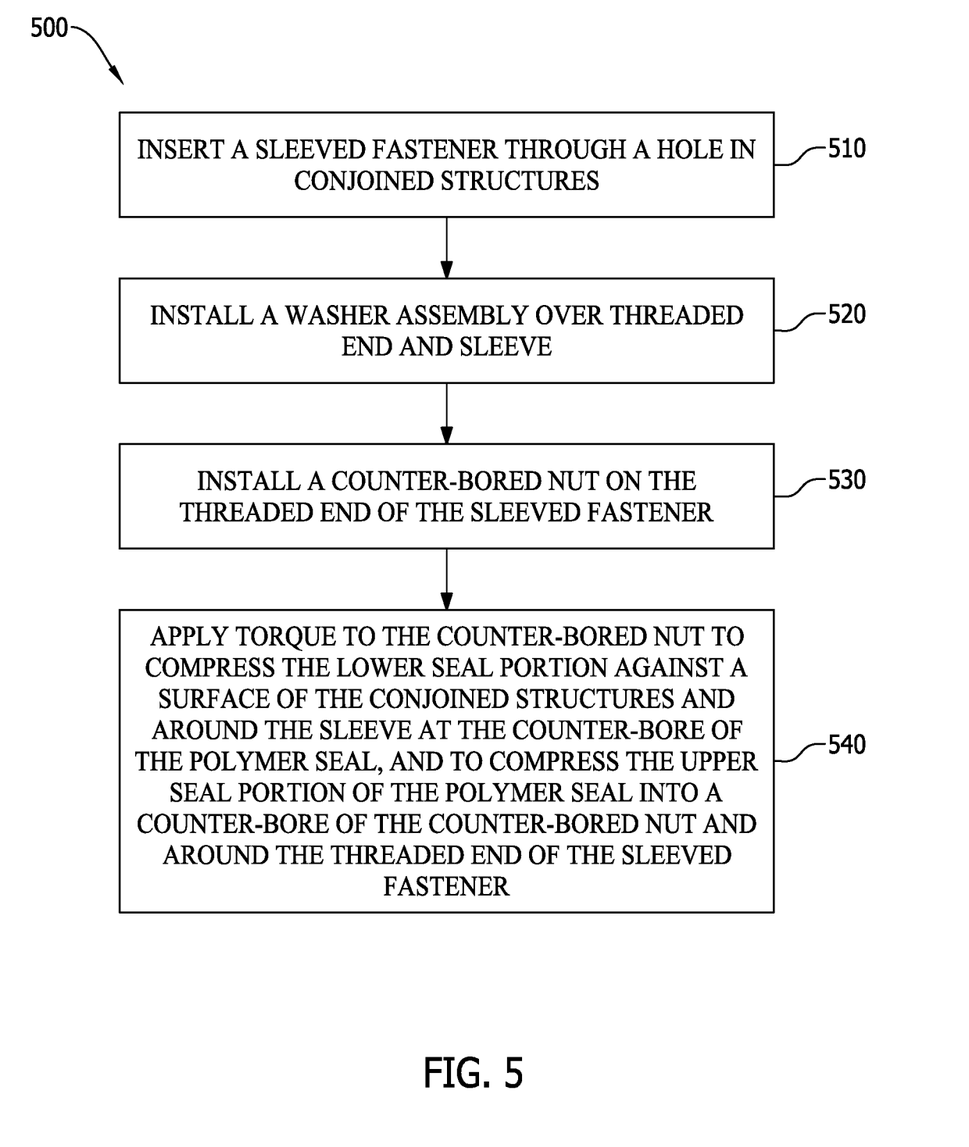
FIG. 5 is a flow diagram of an example of a method of protecting an air-vehicle against lightning strikes.

FIG. 5 is a flow diagram of an example of a method 500 of protecting an air-vehicle against lightning strikes using, for example, fastener assembly 100 shown in FIGS. 1, 2, 3A-3E, 4A, and 4B. The method includes inserting 510 sleeved fastener 102 through hole 404 in conjoined structures 400. Washer assembly 104 is installed 520 over threaded end 114 and sleeve 108. Counter-bored nut 106 is installed 530 on threaded end 114 of sleeved fastener 102. Torque is then applied 540 to counter-bored nut 106 to compress lower seal portion 202 against a surface of conjoined structures 400 and around sleeve 108 at counter-bore 206 of polymer seal 120. The compression forms a seal between sleeve 108 and the wall of conjoined structures 400 that define hole 404. More specifically, the compression seals voids 406 defined between sleeve 108 and the walls of conjoined structures 400 to reduce escape of energized particles from void 406 toward threaded end 114 of sleeved fastener 102. Application 540 of torque to counter-bored nut 106 further compresses upper seal portion 204 into the counter-bore of counter-bored nut 106 and around threaded end 114 of sleeved fastener 102. The compression further forms a seal between a wall of counter-bored nut 106 defining the counter-bore therein and threaded end 114 of sleeved fastener 102. More specifically, the compression seals voids 408 defined between threaded end 114 and the wall of counter-bored nut 106 to reduce escape of energized particles from void 408 toward metallic washer 118.

In embodiments having dielectric material 208 applied to metallic washer 118, application 540 of torque to counter-bored nut 106 compresses a first dielectric-coated axial surface 216 of metallic washer 118 against the surface of conjoined structures 400 and a second dielectric-coated axial surface 216 of metallic washer 118 against an axial surface of counter-bored nut 106.

Figure 6:
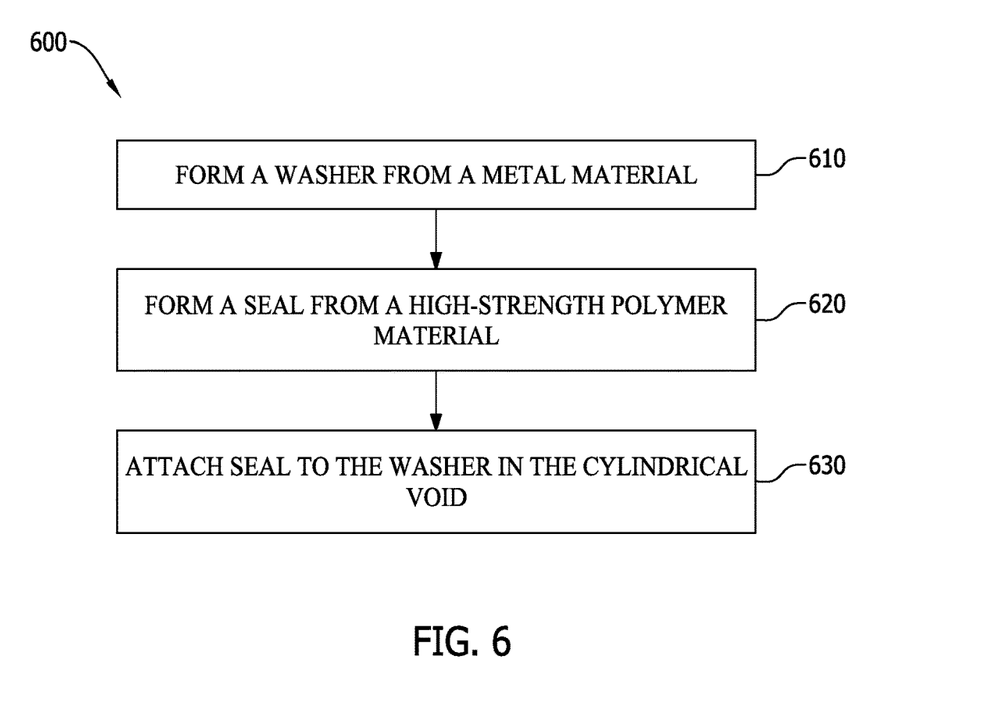
FIG. 6 is a flow diagram of an example of a method of manufacturing the washer assembly shown in FIGS. 2A, 2B, and 3A-3E.

FIG. 6 is a flow diagram of an example of a method 600 of manufacturing washer assembly 104 (shown in FIGS. 2A, 2B, and 3A-3E) for use in a lightning-protection fastener, such as fastener assembly 100 (shown in FIGS. 1, 2, 3A-3E, 4A, and 4B). Method 600 begins with forming 610 metallic washer 118 from a metal material, such as, for example, stainless steel or titanium. Metallic washer 118 is formed, in certain embodiments, by stamping metallic washer 118 from a sheet of metallic material. Stamping metallic washer 118 may be carried out in a single action, where an outer diameter is coarsely set and an inner diameter is precisely set, such that when the sheet metal is stamped, cylindrical void 210 is precisely formed. In alternative embodiments, metallic washer 118 may be stamped in multiple steps including, for example, coarsely setting both the outer and inner diameters for a first stamping action, and then precisely setting the inner diameter for a second stamping action. In further alternative embodiments, metallic washer 118 may be machined from metal material using, for example, a lathe to machine radially outer surface 214 and a drill or other boring machine to machine radially inner surface 212. Alternatively, metallic washer 118 may be machined using a CNC machine. Generally, machining metallic washer 118 improves precision of metallic washer 118, but increases the cost of manufacturing relative to stamping, for example.

Polymer seal 120 is formed 620 from a high-strength polymer material separate from metallic washer 118 and then later attached 630 to metallic washer 118 in cylindrical void 210. Forming 620 polymer seal 120 generally includes forming lower seal portion 202 and upper seal portion 204. Lower seal portion 202 is formed to define counter-bore 206. Lower seal portion 202 is configured to engage, at counter-bore 206, sleeved fastener 102 to form a seal to reduce escape of energized particles in the form of sparks or arcs that may result from, for example, a lightning strike. Upper seal portion 204 is formed such that it extends axially from lower seal portion 202. Upper seal portion 204 is configured to engage a counter-bore of a counter-bored nut, such as nut 106 (shown in FIG. 1), to form a seal inside the counter-bored nut to reduce escape of energized particles in the form of sparks or arcs that may result from, for example, a lightning strike.

Forming 620 polymer seal 120 may be by, for example, injection molding or by machining. At least some polymer materials, such as certain PAI and PI materials, are less suitable for injection molding and, therefore, are generally machined via, lathe, drill, CNC machining, or some combination of the three. Polymer seal 120 may be machined, for example, using a single-axis lathe to form radially outer surfaces 220 and 226, and, in certain embodiments, to form fillets 222 and 230. Polymer seal 120 may be further machined using a drill or other boring machine to form radially inner surfaces 218 and 224. In certain embodiments, particularly those in which polymer seal 120 has axis-asymmetric features, such as keying tabs, for example, polymer seal 120 may be machined using a multi-axis lathe.

Once polymer seal 120 is completely cured and/or machined, polymer seal 120 is attached 630 to metallic washer 118 in cylindrical void 210. Polymer seal 120 may be attached, for example, using an adhesive applied to one or both of metallic washer 118 and polymer seal 120 prior to joining. In alternative embodiments, polymer seal 120 is snapped into cylindrical void 210 and forms a friction-fit such that polymer seal 120 is retained by metallic washer 118. In certain embodiments, polymer seal 120 is attached to metallic washer 118 manually. In other embodiments, polymer seal 120 is attached by a machine or robotic equipment.

In certain embodiments, method 600 further includes coating metallic washer 118 with dielectric material 208. In at least some embodiments, all surfaces of metallic washer 118 are coated with dielectric material 208 accept radially inner surface 212. Dielectric material 208 may be applied via spray, submersion, or any other suitable method. In certain embodiments, metallic washer 118 is masked on one or more surfaces to avoid accumulation of dielectric material 208 in undesired locations.

Figure 7:
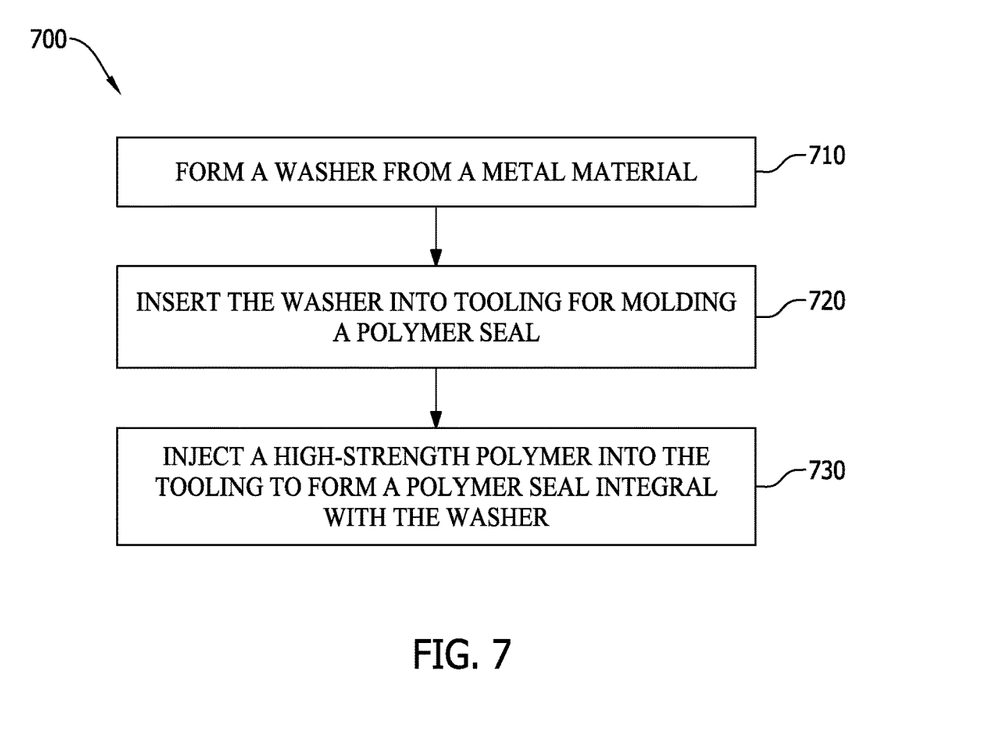
FIG. 7 is a flow diagram of another example of a method of manufacturing the washer assembly shown in FIGS. 2A, 2B, and 3A-3E.

FIG. 7 is a flow diagram of another example of a method 700 of manufacturing washer assembly 104 (shown in FIGS. 2A, 2B, and 3A-3E) for use in a lightning-protection fastener, such as fastener assembly 100 (shown in FIGS. 1, 2, 3A-3E, 4A, and 4B).

As in method 600 (shown in FIG. 6), metallic washer 118 is formed 710 from a metal material using one or more of stamping or machining steps. For lower quantities, the washer is stamped out with rough precision for outer diameter and inner, and then re-stamped for precision on inner.

Metallic washer 118 is then inserted 720 into tooling for molding polymer seal 120 in cylindrical void 210. Such molding is sometimes referred to as in-place molding or insertion molding. Generally, insertion molding is well-suited for large scale production and allows for greater manufacturing tolerances for washer assembly 104 relative to injection molding or machining of polymer seal 120. The tooling for forming polymer seal 120 includes a lower seal mold and an upper seal mold into which metallic washer 118 is inserted. The lower seal mold is configured to form lower seal portion 202, and the upper seal mold is configured to form upper seal portion 204. A high-strength polymer is then injected 730 into the tooling to form polymer seal 120 integrally with metallic washer 118. Integrally forming generally means without any additional assembly steps to attach metallic washer 118 and polymer seal 120.

In at least some embodiments, method 700 further includes coating metallic washer 118 with a dielectric material, such as dielectric material 208.

Example technical effects of the methods, systems, and apparatus described herein include at least one of: (a) sealing voids between conjoined structures and a fastener assembly using a washer assembly having a polymer seal; (b) sealing voids among a fastener, washer, and counter-bored nut; (c) reducing escape of heated gasses, plasmas, or other energized particles, from the void between the fastener and the conjoined structures, toward the threaded end of the fastener; (d) reducing escape of heated gasses, plasmas, or other energized particles, from the void between the fastener and counter-bored nut, toward the washer; (e) preventing arcing among components of a fastener assembly by providing a dielectric coating on the washer to break current paths from the counter-bored nut, to the washer, and to the conjoined structures; (0 reducing wear on fastener assemblies resulting from EME such as sparking and arcing; and (g) simplifying installation of lightning-protection fastener assemblies into conjoined structures by providing a polymer seal attached to a metallic washer in a washer assembly.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

As used herein, an element or step recited in the singular and proceeded with the word "a" or "an" should be understood as not excluding plural elements or steps unless such exclusion is explicitly recited. Furthermore, references to "one embodiment" of the present disclosure or "an example embodiment" are not intended to be interpreted as excluding the existence of additional embodiments that also incorporate the recited features.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of protecting an air vehicle against lighting strikes, the method comprising:
  inserting a sleeved fastener through a hole in conjoined structures, the sleeved fastener defining an axis along its length and comprising a threaded end and a sleeve;
  installing a washer assembly over the threaded end and the sleeve, the washer assembly comprising a metallic washer and a polymer seal radially inward of the metallic washer, the polymer seal comprising a lower seal portion defining a counter-bore, and an upper seal portion extending axially from the lower seal portion;
  installing a counter-bored nut on the threaded end of the sleeved fastener; and
  applying torque to the counter-bored nut to compress the lower seal portion against a surface of the conjoined structures and around the sleeve at the counter-bore of the polymer seal, and to compress the upper seal portion of the polymer seal into a counter-bore of the counter-bored nut and around the threaded end of the sleeved fastener, wherein the lower seal portion comprises a polymeric annulus having:
  a radially inner surface that bounds the counter-bore and extends axially beyond the metallic washer in a direction opposite the upper seal portion;
  a radially outer surface coextensive with the metallic washer; and
  a fillet extending between the radially inner surface and the radially outer surface.

2. The method of claim 1, wherein the washer assembly further comprises a dielectric material coating the metallic washer, and wherein applying torque to the counter-bored nut further comprises compressing a first dielectric-coated axial surface of the metallic washer against the surface of the conjoined structures and compressing a second dielectric-coated axial surface of the metallic washer against an axial surface of the counter-bored nut.

3. The method of claim 1, wherein applying torque to the counter-bored nut to compress the polymer seal at the counter-bore further comprises forming a seal between the sleeve of the sleeved fastener and a wall of the conjoined structures defining the hole therein.

4. The method of claim 3, wherein forming the seal between the sleeve and the wall of the conjoined structures comprises sealing a void defined between the sleeve of the sleeved fastener and the wall of the conjoined structures to reduce escape of energized particles from the void toward the threaded end of the sleeved fastener.

5. The method of claim 1, wherein applying torque to the counter-bored nut to compress the upper seal portion of the polymer seal further comprises forming a seal between a wall of the counter-bored nut defining the counter-bore therein and the threaded end of the sleeved fastener.

6. The method of claim 5, wherein forming the seal between the counter-bored nut and the sleeved fastener comprises sealing a void defined between the threaded end of the sleeved fastener and the wall of the counter-bored nut to reduce escape of energized particles from the void toward the metallic washer.

7. The method of claim 1 further comprising boring the hole in the conjoined structures, including boring through a plurality of plys of a composite material.

8. The method of claim 7, wherein inserting the sleeved fastener through the hole in conjoined structures comprises inserting the sleeved fastener through the hole through the plurality of plys, thereby defining at least one void between the sleeve of the sleeved fastener and a wall formed by the plurality of plys.

9. The method of claim 1, wherein the polymer seal comprises a high-strength polymer selected from the group consisting of:
  polyamide-imide (PAI);
  polyaryletherketone (PAEK);
  polyphenylene sulfide (PPS);
  polyphenyl sulfone (PPSU); and
  polyaryl ether sulfone (PAES).

10. A fastener assembly comprising:
  a sleeved fastener comprising a sleeve and a shank extending therethrough, the shank defining an axis along its length and having a threaded end, the sleeved fastener configured to be inserted through a hole in conjoined structures;
  a washer assembly comprising a metallic washer and a polymer seal radially inward of the metallic washer, the polymer seal comprising a lower seal portion defining a counter-bore, and an upper seal portion extending axially from the lower seal portion, the washer assembly configured to be installed over the threaded end and the sleeve of the sleeved fastener; and
  a counter-bored nut having a counter-bore and threads defined therein, the counter-bored nut configured to be installed on the threaded end of the sleeved fastener and turned to compress the lower seal portion against a surface of the conjoined structures and around the sleeve at the counter-bore of the polymer seal, and to compress the upper seal portion of the polymer seal into the counter-bore of the counter-bored nut and around the threaded end of the sleeved fastener, wherein the lower seal portion comprises a polymeric annulus having:
    a radially inner surface that bounds the counter-bore and extends axially beyond the metallic washer in a direction opposite the upper seal portion;
    a radially outer surface coextensive with the metallic washer; and
    a fillet extending between the radially inner surface and the radially outer surface.

11. The fastener assembly of claim 10, wherein the washer assembly further comprises a dielectric material coating the metallic washer.

12. The fastener assembly of claim 11, wherein the dielectric material coats a radially inner surface of the metallic washer.

13. The fastener assembly of claim 10, wherein the polymer seal comprises a high-strength polymer selected from the group consisting of:
  polyamide-imide (PAI);
  polyaryletherketone (PAEK);
  polyphenylene sulfide (PPS);
  polyphenyl sulfone (PPSU); and
  polyaryl ether sulfone (PAES).

14. The fastener assembly of claim 10, wherein the polymer seal further comprises a filler material distributed throughout a polymer material from which the polymer seal is formed.

15. The fastener assembly of claim 10, wherein the sleeved fastener comprises a tapered shank.

16. The fastener assembly of claim 10, wherein the sleeved fastener comprises a cylindrical shank.

17. The fastener assembly of claim 10, wherein the upper seal portion comprises a polymeric annulus having:
  a radially inner surface that abuts the shank of the sleeved fastener;
  a radially outer surface and an axial end surface distal of the counter-bore defined by the polymer seal; and
  a fillet extending from the radially outer surface to the axial end surface.

18. The fastener assembly of claim 10, wherein the metallic washer comprises a metal material selected from the group consisting of:
  stainless steel; and
  titanium.

19. The fastener assembly of claim 10 further comprising a dielectric material coating the counter-bored nut.

20. The fastener assembly of claim 10 further comprising an adhesive applied between the polymer seal and the metallic washer.

* * * * *